(12) United States Patent
Janakiraman et al.

(10) Patent No.: US 12,549,604 B2
(45) Date of Patent: Feb. 10, 2026

(54) MULTIFACETED SECURITY GROUP CLASSIFICATION IN OVERLAY FABRIC

(71) Applicant: Cisco Technology, Inc., San Jose, CA (US)

(72) Inventors: Rajagopalan Janakiraman, Cupertino, CA (US); Kiran Sasidharan Pillai, Fremont, CA (US); Muralidhar Annabatula, Dublin, CA (US); Murukanandam K. Panchalingam, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 18/297,253

(22) Filed: Apr. 7, 2023

(65) Prior Publication Data

US 2024/0340317 A1  Oct. 10, 2024

(51) Int. Cl.
*H04L 9/40* (2022.01)
*H04L 12/46* (2006.01)

(52) U.S. Cl.
CPC .......... *H04L 63/20* (2013.01); *H04L 12/4641* (2013.01); *H04L 2212/00* (2013.01)

(58) Field of Classification Search
CPC . H04L 63/20; H04L 12/4641; H04L 2212/00; H04L 12/4633
See application file for complete search history.

(56) References Cited

U.S. PATENT DOCUMENTS

| | | | |
|---|---|---|---|
| 7,317,721 B1* | 1/2008 | Sindhu | H04L 45/16 370/428 |
| 9,432,298 B1* | 8/2016 | Smith | H04L 49/9057 |
| 10,171,344 B1 | 1/2019 | Venkataramanan et al. | |
| 12,425,340 B2* | 9/2025 | Louzoun | H04L 69/22 |
| 2017/0353433 A1* | 12/2017 | Antony | H04L 63/0263 |
| 2020/0213154 A1 | 7/2020 | Han et al. | |
| 2021/0135988 A1* | 5/2021 | Erman | H04L 47/34 |
| 2021/0234786 A1 | 7/2021 | Devadoss et al. | |
| 2021/0243163 A1 | 8/2021 | Miriyala et al. | |
| 2022/0198014 A1 | 6/2022 | Boling et al. | |

* cited by examiner

*Primary Examiner* — Sm A Rahman
(74) *Attorney, Agent, or Firm* — Patterson + Sheridan, LLP (57) ABSTRACT

Techniques for using policies in an overlay communication network are disclosed. These techniques include deriving a plurality of source tags for a flow relating to an overlay communication network, the plurality of source tags relating to one or more policies for the flow. The techniques further include deriving a tag pointer for the flow, the tag pointer corresponding to all of the plurality of source tags, encapsulating the tag pointer in the flow, and transmitting the flow over the overlay communication network, wherein the tag pointer is configured to be used to identify a plurality of policies for the flow on egress from the overlay communication network.

20 Claims, 5 Drawing Sheets

MULTIFACETED SECURITY GROUP CLASSIFICATION IN OVERLAY FABRIC

TECHNICAL FIELD

Embodiments presented in this disclosure generally relate to network communications. More specifically, embodiments disclosed herein relate to network security.

BACKGROUND

Hybrid data centers, made up of a combination of public cloud storage, private cloud storage, on-premises storage, or other storage environments, are becoming increasingly popular. To operate successfully in hybrid data centers, application workloads should quickly adapt to these varying environments. This makes securing application workloads very challenging.

For example, security operators have used a micro-segmentation or zero-trust paradigm using security groups. But this leads to additional challenges, like applications having multiple security group identities with each group having its own set of policies. For example, a given virtual machine (VM) instance can belong to one application tier with certain set of policies (e.g., security policies) and also at the same time belong to a different application tier with a different set of policies. In addition, a VM can use operating system (OS) based grouping, location based grouping, or a variety of other groups. But existing solutions allow a given VM or endpoint to belong to only one identity group, requiring extremely complex workarounds to support multi-group intent.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes deriving a plurality of source tags for a flow relating to an overlay communication network, the plurality of source tags relating to one or more policies for the flow. The method further includes deriving a tag pointer for the flow, the tag pointer corresponding to all of the plurality of source tags. The method further includes encapsulating the tag pointer in the flow. The method further includes transmitting the flow over the overlay communication network. The tag pointer is configured to be used to identify a plurality of policies for the flow on egress from the overlay communication network.

Embodiments further include system, including a processor, and a memory having instructions stored thereon which, when executed on the processor, performs operations. The operations include deriving a plurality of source tags for a flow relating to an overlay communication network, the plurality of source tags relating to one or more policies for the flow. The operations further include deriving a tag pointer for the flow, the tag pointer corresponding to all of the plurality of source tags. The operations further include encapsulating the tag pointer in the flow. The operations further include transmitting the flow over the overlay communication network. The tag pointer is configured to be used to identify a plurality of policies for the flow on egress from the overlay communication network.

Embodiments further include a non-transitory computer-readable medium having instructions stored thereon which, when executed by a processor, performs operations. The operations include receiving a flow transmitted using an overlay communication network. The operations further include identifying a tag pointer for the flow based on decapsulating the flow. The operations further include determining a plurality of source tags for the flow using the tag pointer. The operations further include identifying a plurality of policies for the flow based on the plurality of source tags.

Example Embodiments

One or more techniques described below try to address the multi-group security gap by deriving multiple tags and applying policies (e.g., security or quality of service (QOS) policies) using existing overlay technologies and existing packet formats. For example, in existing solutions any security identifiers are typically available only locally for a given VM (e.g., locally for a given virtual network interface card (VM NIC)), and are not available across the cloud fabric.

One or more solutions herein solve this problem by carrying multi-group identities across the fabric (e.g., ingress, egress, to service nodes, etc.) using a single tag pointer. This multi-group identity can be used to achieve numerous benefits, including security, QoS, span, and service chaining with in-built priority resolution. Further, the tag pointer can be carried across existing transmission networks (e.g., overlay networks) by encapsulating the tag pointer in the flow (e.g., in an overlay network header).

Existing overlay solutions typically provide the capability to carry a single source tag, at most, in a header, so that an egress node can derive the destination security tag and apply the policy. One or more techniques described herein allow a flow to instead carry a tag or label pointer which provides indirection to the list of tags in the overlay header. An ingress node can derive a tag or label pointer when it cannot derive the destination tag, and can encode the tag or label pointer in an overlay header.

A single endpoint, tier, or application can thus derive multiple identities combined into a single tag pointer. The tag pointer can be easily carried over overlay network using existing standards-based mechanism, without requiring custom headers. The tag pointer can then be used in the egress to re-drive the same mappings and apply policies for each mapping or group, as defined by the user, using a combination of priority resolution among the policies and action merge capabilities (e.g., of a suitable application-specific integrated circuit (ASIC)).

In an embodiment, the hardware pipeline includes only two additional lookups: on ingress, a lookup based on multiple tags to derive the tag pointer before the flow is encapsulated, and on egress doing the inverse during decapsulation. Further, as discussed below in relation to FIG. 4, in an embodiment creation of a tag pointer is dynamic. A tag pointer is created, dynamically, based on detection of an endpoint which maps to a specific collection of groups. The ingress node requests allocation of a tag pointer (e.g., by a software defined network (SDN) controller or another aspect of the management plane), and in the egress, a tag pointer miss prompts the egress node to fetch the mapping (e.g., from the SDN controller). This ensures that tag pointers are created only for specific combinations in use and not for all combinations.

Further, in some embodiments, multiple tag information can be carried from ingress nodes across to egress nodes, where the policies can be applied, with no restriction on policy application to ingress only or requirement that tag mapping be present on all nodes. For example, once source and destination security group tags are available at either ingress or egress nodes, a policy pipeline can do combinational lookups and can derive a varying set of actions and perform prioritization and action-merging. This is discussed further, below, with regard to FIG. 5. In this example, prioritization can be provided in group definitions or rule definitions, or can be implicitly derived based on the group granularities.

Figure 1:
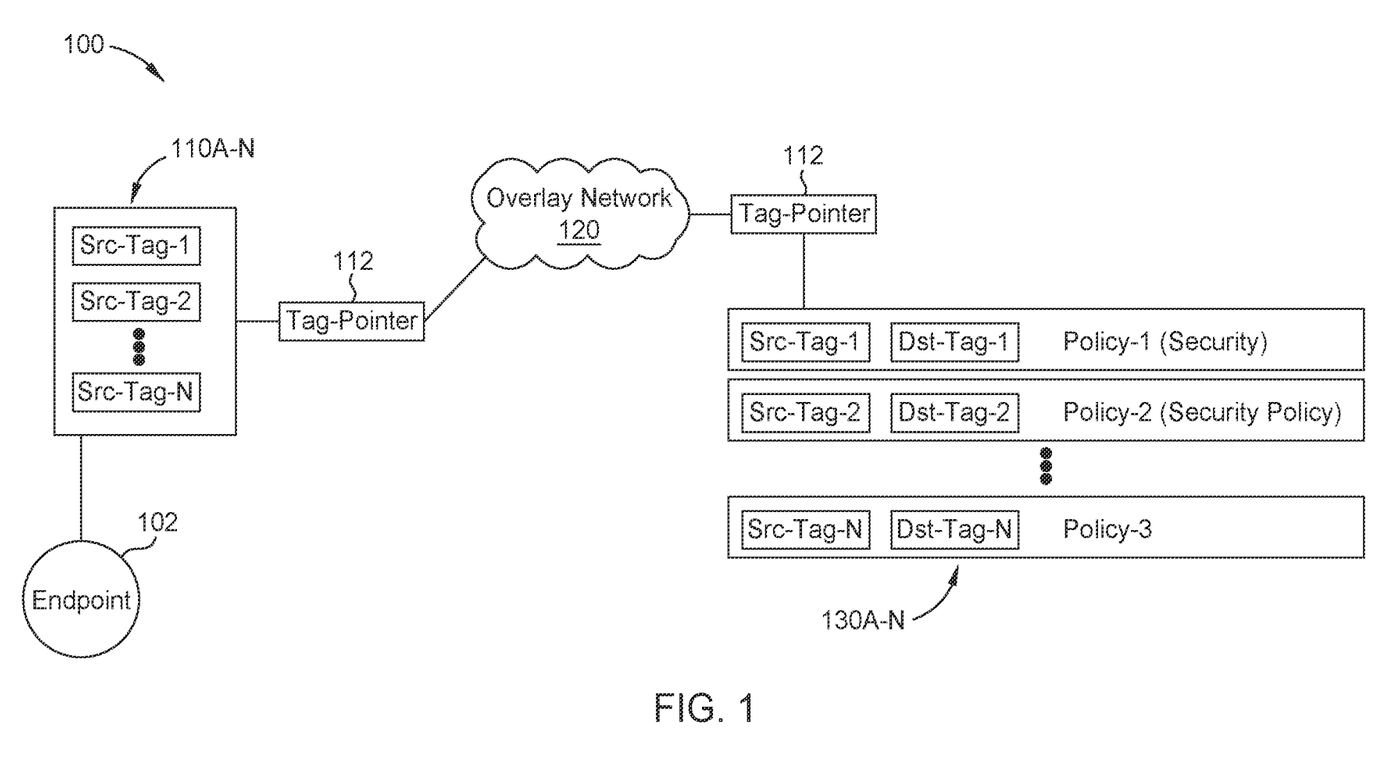
FIG. 1 illustrates a computing environment for multifaceted security group classification, according to one embodiment.

FIG. 1 illustrates a computing environment 100 for multifaceted security group classification, according to one embodiment. In an embodiment, an endpoint 102 initiates transmission of a data flow over an overlay network 120. The endpoint 102 is associated with a number of groups (e.g., security groups) that define policies for the transmission of the data flow. For example, the flow can be associated with security policies, QoS policies, or any other suitable policies. Further, the flow can be associated with multifaceted policies, based on the groups associated with the endpoint 102. For example, the endpoint 102 can belong to one security group for a public cloud network, another security group for a private cloud network, and another different security group for an on-premises network.

One or more source tags 110A-N can delineate the source groups with which the endpoint is associated. For example, a source tag Src-Tag-1 identifies the endpoint as associated with a first security group. A source tag Src-Tag-2 identifies the endpoint as associated with a second security group. In an embodiment, all of these source tags 110A-N for the flow can be identified using a tag pointer 112. For example, as discussed further, below, with regard to FIGS. 3-4, at ingress a network node can identify source tags associated with a flow and determine whether a tag pointer corresponding to that combination of source tags exists. If so, the network node can retrieve the tag pointer. If not, the network node can create a new tag pointer. In both circumstances, the network node can encapsulate the tag pointer 112 in the flow.

In an embodiment, the flow (e.g., including the encapsulated tag pointer 112) is transmitted over the overlay network 120. The overlay network 120 can be any suitable overlay network (e.g., using existing technologies). For example, the overlay network 120 can be a virtual extensible local area network (VXLAN), including a VXLAN with group policy option (VXLAN-GPO) or group based policy (VXLAN-GBP). As another example, the overlay network 120 can use generic network virtualization encapsulation (GENEVE), can be a segment routing over IPv6 (SRv6) network, or can be any other suitable overlay network. Further, while embodiments herein are described in relation to an overlay network for illustration purposes, this is merely an example. Any other suitable transmission network can be used (e.g., instead of, or in addition to, an overlay network).

In an embodiment, on egress from the overlay network a network node identifies the tag pointer 112. The tag pointer 112 can then be used to identify all source and destination tag combinations 130A-N for the flow. Corresponding policies can be applied, for this combination of source and destination tags. This is discussed further, below, with regard to FIG. 5.

Figure 2:
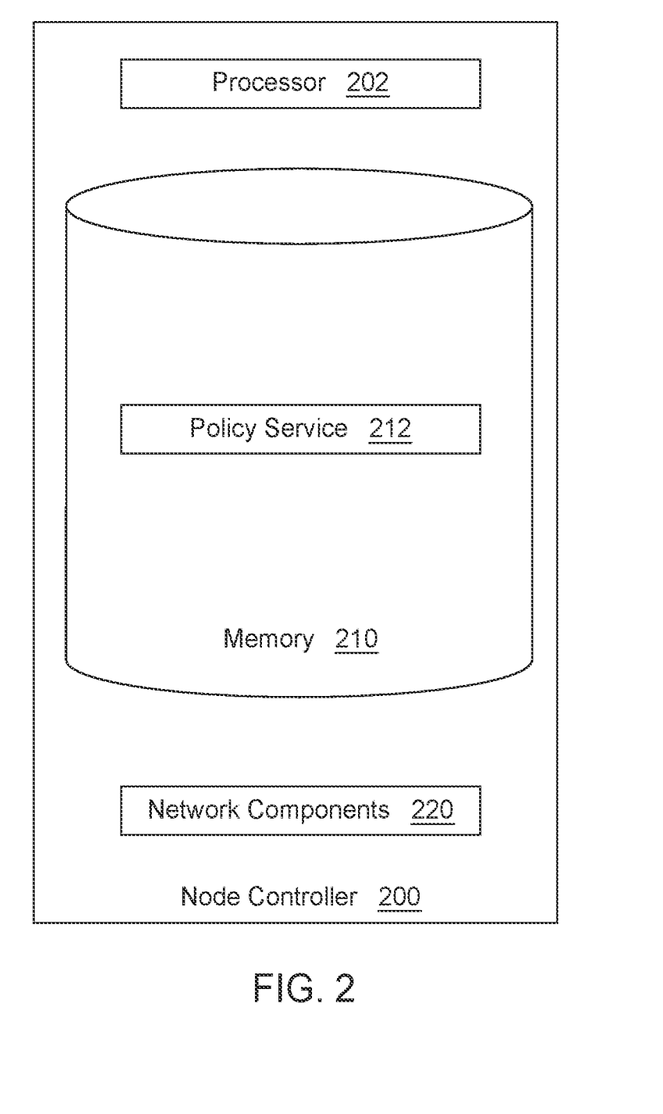
FIG. 2 is a block diagram illustrating a node controller for multifaceted security group classification, according to one embodiment.

FIG. 2 is a block diagram illustrating a node controller 200 for multifaceted security group classification, according to one embodiment. The node controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the node controller 200 to interface with a wireless communication network, as discussed above in relation to FIG. 1. For example, the network components 220 can include WiFi or cellular network interface components and associated software.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the node controller 200. The program code is generally described as various functional "applications" or "modules" within the memory 210, although alternate implementations may have different functions and/or combinations of functions. Within the memory 210, a policy service 212 facilitates multifaceted security group classification, as discussed above in relation to FIG. 1 and below in relation to FIGS. 3-7.

Figure 3:
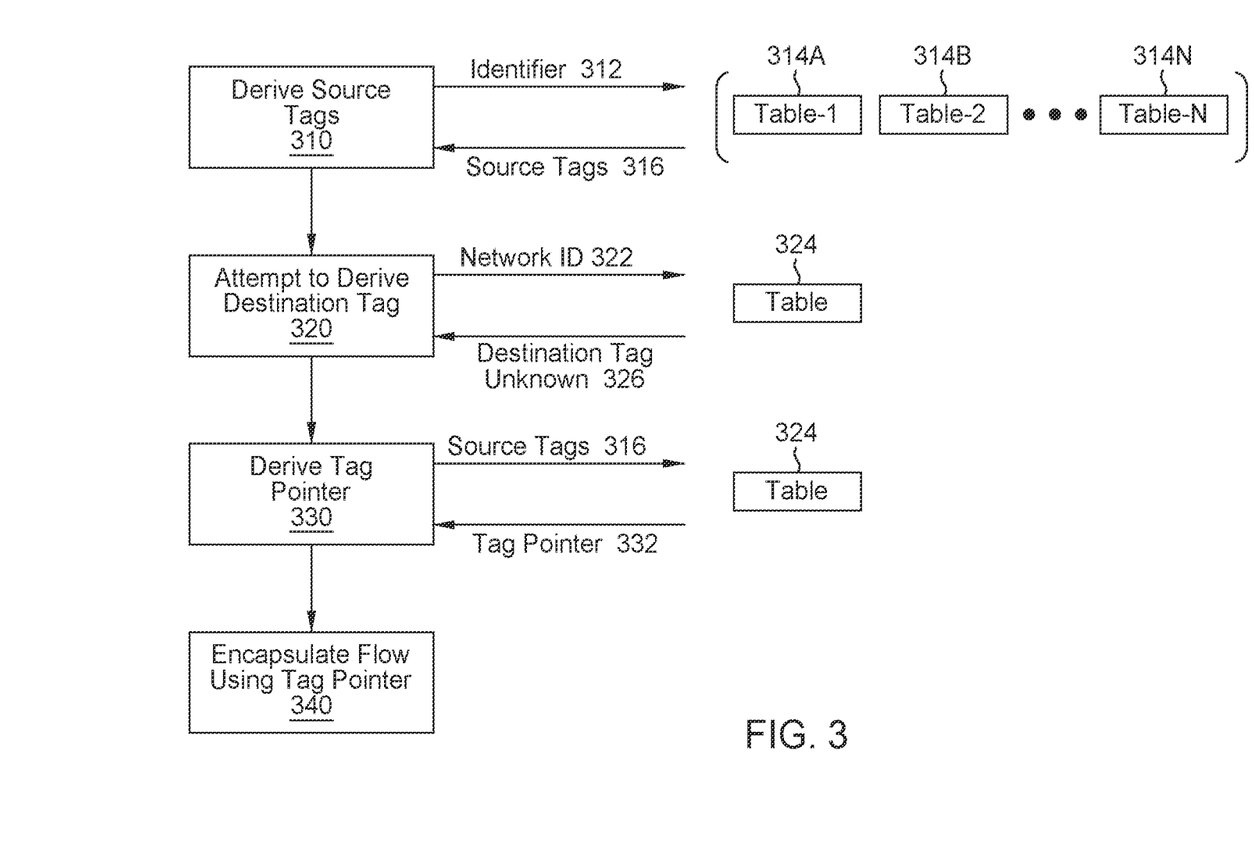
FIG. 3 illustrates ingress for multifaceted security group classification, according to one embodiment.

FIG. 3 illustrates ingress for multifaceted security group classification, according to one embodiment. At block 310 a policy service (e.g., the policy service 212 illustrated in FIG. 2) derives a source tag for a flow. For example, the policy service can operate on an ingress node for an overlay network (e.g., the overlay network 120 illustrated in FIG. 1). The source tag corresponds to one of the source tags 110A-N illustrated in FIG. 1 (e.g., identifying groups for the flow). As discussed below in relation to block 320, in an embodiment the policy service can derive one or more source tags for the flow (e.g., using suitable identifiers) at ingress, but cannot derive destination tags until egress. A given fabric can distribute group tags (e.g., source tags) using any suitable technique. For example, the fabric can choose a controller driven pre-populate mechanism to distribute a super-group tag to constituent group tags. Or the fabric can use a publish-subscribe mechanism where a controller can distribute this information on an as-needed basis.

For example, the policy service can derive one or more source tags for the flow using an identifier 312. The identifier 312 can be used to lookup source tags 316 in one or more tables 314A-N. In an embodiment, the identifier 312 includes one or more identifiers used to lookup the source tags 316 in the tables 314A-N. For example, the policy service can use an overlay header, or a network identifier or network segment identifier, including a virtual routing forward address (VRF), to lookup the source tags 316. As another example, the policy service can use a source internet protocol (IP) address, a source logical port (SLP) address, (e.g., a port and virtual local area network (VLAN), alone or in combination), or any other suitable identifier.

The tables 314A-N can be any suitable storage repository, or combination of storage repositories. For example, the tables 314A-N can be stored in hardware memories (e.g., static random access memory (SRAM) or ternary content-addressable memory (TCAM)) inside an ASIC or another suitable hardware component. In an embodiment, this allows lookups to happen very quickly in pipeline. This is merely an example, and any suitable repository can be used. Further, while the tables 314A-N are illustrated as separate tables corresponding to the source tags 316, this is merely an example. The tables 314A-N can be a single storage location, multiple storage locations each corresponding to a different source tag 316, multiple storage locations corresponding to different aspects of the source tags 316, or any other suitable storage location.

At block 320, the policy service attempts to derive a destination tag for the flow. The policy service uses a network identifier 322 to lookup the destination tag in a table 324. The network identifier 322 can include a VRF, a destination IP address, or any other suitable identifier. But, as discussed above, in an embodiment the policy service cannot derive the destination tag at ingress. This is only known at egress. Therefore, the lookup in the table 324 results in a destination tag unknown message 326. Just as for the tables 314A-N discussed above, the table 324 can be any suitable storage repository, or combination of storage repositories. For example, the table 324 can be tables in a suitable hardware memory (e.g., inside an ASIC).

At block 330, the policy service derives a tag pointer. This is discussed further, below, with regard to FIG. 4. For example, the policy service can determine whether a tag pointer corresponding to the source tags 316 exists in the table 324. If so, the policy service can retrieve the tag pointer 332 from the table 324. If not, the policy service can generate a tag pointer 332, record the tag pointer 332 in the table 324, and return the tag pointer 332 to encapsulate in the flow.

At block 340, the policy service encapsulates the flow using the tag pointer. For example, the policy service can encapsulate the tag pointer in the flow for transmission over an overlay network (e.g., the overlay network 120 illustrated in FIG. 1). The policy service can encapsulate the tag pointer in a suitable header, or any other aspect of the flow.

Figure 4:
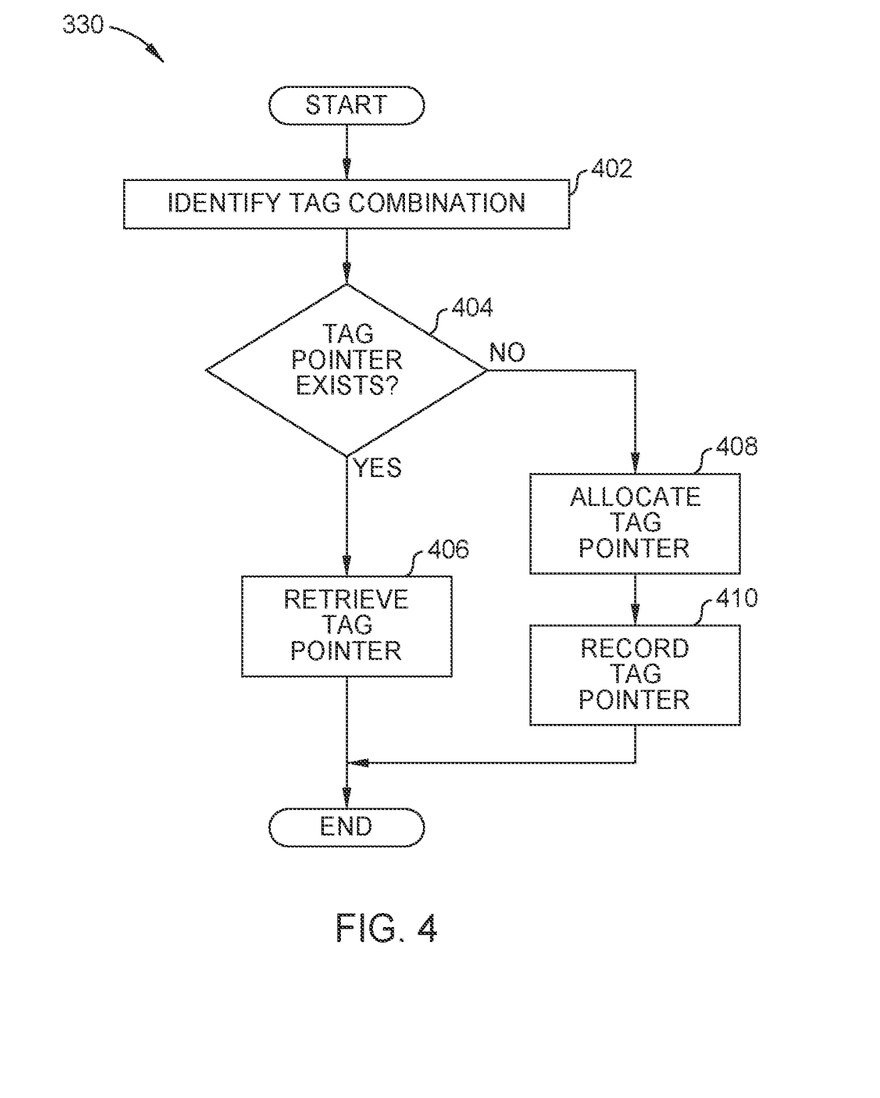
FIG. 4 is a flowchart illustrating deriving a tag pointer for multifaceted security group classification, according to one embodiment.

FIG. 4 is a flowchart illustrating deriving a tag pointer for multifaceted security group classification, according to one embodiment. In an embodiment, FIG. 4 corresponds with block 330 illustrated in FIG. 3. At block 402, a policy service (e.g., the policy service 212 illustrated in FIG. 2) identifies the tag combination. For example, a given flow can be associated with a number of different source tags on ingress to a network node. These source tags can identify security groups for the flow, QoS groups for the flow, or any other suitable policy groups for the flow. As discussed above, the flow can be associated with multiple groups of the same type (e.g., multiple security groups). The policy service can identify the particular combination of source tags (e.g., source groups) for the flow.

At block 404, the policy service determines whether a tag pointer exists for the tag combination. As discussed above, in an embodiment the policy service generates tag pointers dynamically, as necessary, rather than prior to operation. If a tag pointer exists (e.g., has been previously dynamically generated for the tag combination identified at block 402), the policy service proceeds to block 406. If not, the policy service proceeds to block 408.

At block 406, the policy service retrieves the tag pointer. For example, the policy service can be recorded in a suitable storage location (e.g., the table 324 illustrated in FIG. 3). The policy service can retrieve the tag pointer, using the identified tag combination. In an embodiment, the tag combination itself serves as an identifier for the tag pointer in the storage repository. Alternatively, the policy service uses another suitable identifier.

Returning to block 404, if the tag pointer does not exist (e.g., in the storage repository), the policy service proceeds to block 408. At block 408, the policy service allocates the tag pointer. For example, the policy service can request allocation of a tag pointer (e.g., by an SDN controller or another aspect of the management plane).

In an embodiment, the tag pointer can be any suitable value. For example, the tag pointer can be a 16 bit value with a range from 0-65535. A portion of entries in this range 0-65535 can be reserved for the tag pointer, while the rest can be used for the tags themselves. An egress node can then, as discussed further below with regard to FIG. 5, identify a tag pointer as a value falling within this reserved range. This is merely an example, and the tag pointer can be any suitable value and can be identified using any suitable technique.

At block 410, the policy service records the tag pointer. As discussed above, in an embodiment the tag pointer is generated dynamically, as needed, for a given combination of tags. The tag pointer can then be recorded for future use by a flow associated with the same combination of tags. For example, the policy service can record the tag pointer in a storage repository (e.g., the table 324 illustrated in FIG. 3).

Figure 5:
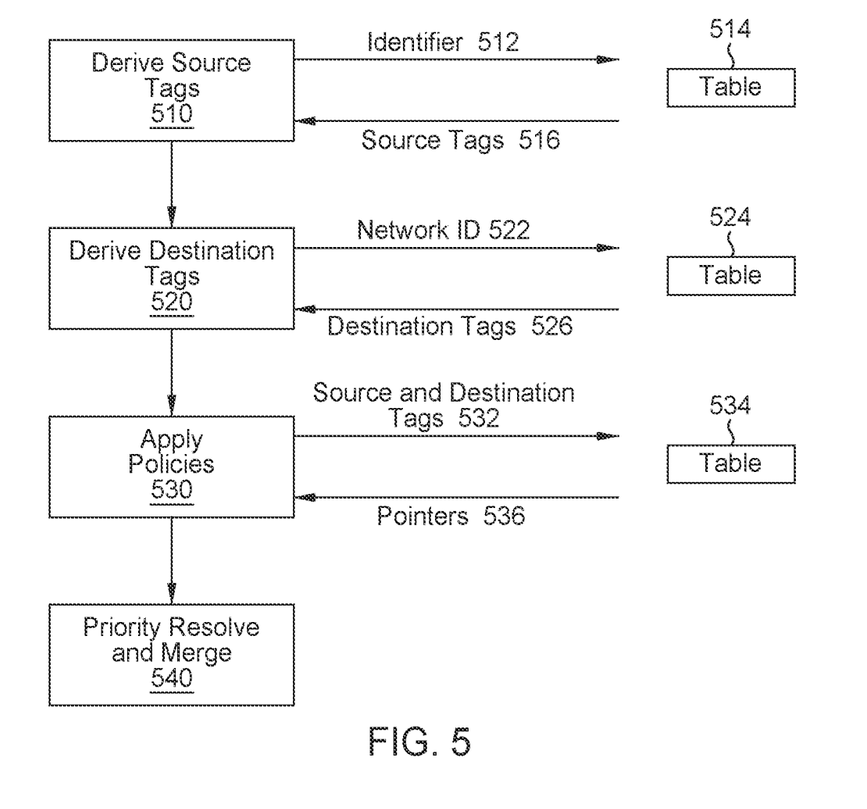
FIG. 5 illustrates egress for multifaceted security group classification, according to one embodiment.

FIG. 5 illustrates egress for multifaceted security group classification, according to one embodiment. At block 510, a policy service (e.g., the policy service 212 illustrated in FIG. 2) derives source tags from a flow. For example, the policy service can operate on an egress network node from an overlay network (e.g., the overlay network 120 illustrated in FIG. 1) and can identify source tags for a flow transmitted through the overlay network.

In an embodiment, the policy service uses a tag pointer 512 to identify source tags 516. For example, the flow can have a tag pointer encapsulated in the flow (e.g., in a suitable header). This is discussed further, above, in relation to blocks 330 and 340 illustrated in FIG. 3. The policy service can use the tag pointer to retrieve one or more source tags from a storage repository (e.g., a table 514). As discussed above in relation to FIG. 3, the storage repository can be any suitable storage repository (e.g., a suitable hardware memory inside an ASIC). In an embodiment, a tag pointer miss (e.g., when attempting to retrieve the source tags 516) prompts the policy service to fetch the mapping (e.g., from an SDN controller or another suitable controller).

At block 520, the policy service derives one or more destination tags for the flow. As discussed above in relation to FIG. 3, in an embodiment the tag pointer identifies source tags for the flow. Destination tags can be associated with an identifier for the flow. For example, the policy service can use a network identifier 522 to retrieve one or more destination tags 526 associated with the flow. These destination tags 526 can be stored in any suitable storage repository (e.g., a table 524). The network identifier 522 can be a VRF, a destination IP address, or any other suitable identifier.

At block 530, the policy service applies policies for the flow. For example, the policy service can apply security policies, QoS policies, and any other suitable policies. The policy service can use the combination of source and destination tags 532 identified at block 510 and 520 to determine which policies should applied for the flow. In an embodiment, the policy service uses the source and destination tags 532 to retrieve policies 536 from a suitable storage location (e.g., a table 534). The table 534 can be the same table 524 used to derive the destination tags. Alternatively, the table 534 can be a different table any other suitable storage location.

At block 540, the policy service performs a priority resolve and merge. For example, the policies identified at block 530 may include conflicting or overlapping aspects. The policy service can perform priority resolution, action-merge, or both, among the policies. For example, the policies 536 can include multiple security policies associated with the flow. Each of these policies can have an associated priority, and the policy service can resolve overlap between the policies using this priority (e.g., higher priority policies can be given precedence). In an embodiment, in the case of conflicting actions for the policies at different levels, the more specific security group's policy triumphs. This is merely an example. Further an ASIC in the egress node can include action merge capabilities. These can be used to merge the policy actions of the policies 536.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
deriving a plurality of source tags for a flow relating to an overlay communication network, the plurality of source tags relating to one or more policies for the flow;
deriving a tag pointer for the flow, the tag pointer corresponding to all of the plurality of source tags;
encapsulating the tag pointer in the flow, wherein the flow, including the tag pointer, is encapsulated in a header of an overlay network packet associated with the overlay communication network; and
transmitting the overlay network packet over the overlay communication network, wherein the tag pointer is configured to be used to identify a plurality of policies for the flow on egress from the overlay communication network.

2. The method of claim 1, wherein at least one of: (i) deriving the plurality of source tags, (ii) deriving the tag pointer, or (iii) encapsulating the tag pointer is performed at an ingress node for the overlay communication network.

3. The method of claim 2, further comprising:
wherein the tag pointer is configured to be used to identify a plurality of policies for the flow at an egress node for the overlay communication network.

4. The method of claim 1, wherein the overlay communication network comprises at least one of: (i) a virtual extensible local area network (VXLAN), (ii) a generic network virtualization encapsulation (GENEVE) network, or (iii) a segment routing over IPV6 (SRv6) network.

5. The method of claim 1, wherein deriving the tag pointer for the flow comprises:
determining that no tag pointer exists for the plurality of source tags;
allocating the tag pointer for the plurality of source tags; and
recording the tag pointer.

6. The method of claim 5, further comprising:
deriving the tag pointer for a second flow, different from the flow, relating to the plurality of source tags, comprising:
determining that the tag pointer was previously recorded for the plurality of source tags.

7. The method of claim 5, wherein allocating the tag pointer for the plurality of source tags comprises:
requesting allocation of the tag pointer from a network component in a management plane relating to the overlay network.

8. The method of claim 1, wherein the flow is configured to be received by an egress node for the overlay network, and wherein the egress node is configured to resolve priority among the plurality of policies.

9. The method of claim 8, wherein resolving priority among the plurality of policies comprises identifying a most specific policy, among the plurality of policies.

10. The method of claim 1, wherein each of the plurality of policies relates to a different security policy for the flow.

11. A system, comprising:
a processor; and
a memory having instructions stored thereon which, when executed on the processor, performs operations comprising:
deriving a plurality of source tags for a flow relating to an overlay communication network, the plurality of source tags relating to one or more policies for the flow;
deriving a tag pointer for the flow, the tag pointer corresponding to all of the plurality of source tags;
encapsulating the tag pointer in the flow, wherein the flow, including the tag pointer, is encapsulated in a header of an overlay network packet associated with the overlay communication network; and
transmitting the overlay network packet over the overlay communication network, wherein the tag pointer is configured to be used to identify a plurality of policies for the flow on egress from the overlay communication network.

12. The system of claim 11, wherein at least one of: (i) deriving the plurality of source tags, (ii) deriving the tag pointer, or (iii) encapsulating the tag pointer is performed at an ingress node for the overlay communication network.

13. The system of claim 12, further comprising:
wherein the tag pointer is configured to be used to identify a plurality of policies for the flow at an egress node for the overlay communication network.

14. The system of claim 11, wherein deriving the tag pointer for the flow comprises:
determining that no tag pointer exists for the plurality of source tags;
allocating the tag pointer for the plurality of source tags; and
recording the tag pointer.

15. The system of claim 14, further comprising:
deriving the tag pointer for a second flow, different from the flow, relating to the plurality of source tags, comprising:
determining that the tag pointer was previously recorded for the plurality of source tags.

16. A non-transitory computer-readable medium having instructions stored thereon which, when executed by a processor, performs operations comprising:
receiving an overlay network packet transmitted using an overlay communication network, wherein a tag pointer for a flow is encapsulated in the flow, and wherein the flow, including the tag pointer, a tag pointer for the flow is encapsulated in a header of the overlay network packet;
identifying the tag pointer for the flow based on decapsulating the flow;
determining a plurality of source tags for the flow using the tag pointer; and
identifying a plurality of policies for the flow based on the plurality of source tags.

17. The non-transitory computer-readable medium of claim 16, wherein at least one of: (i) identifying the tag pointer for the flow based on decapsulating the flow, (ii) determining the plurality of source tags for the flow using the tag pointer, or (iii) identifying the plurality of policies for the flow based on the plurality of source tags is performed at an egress node for the overlay communication network.

18. The non-transitory computer-readable medium of claim 16, the operations further comprising:
    resolving priority among the plurality of policies; and
    applying the policies for the flow.

19. The non-transitory computer-readable medium of claim 18, wherein resolving priority among the plurality of policies comprises identifying a most specific policy, among the plurality of policies.

20. The non-transitory computer-readable medium of claim 16, wherein each of the plurality of policies relates to a different security policy for the flow.

* * * * *